(12) United States Patent
Peev et al.

(10) Patent No.: US 6,767,399 B2
(45) Date of Patent: Jul. 27, 2004

(54) ADMIXTURE FOR PRODUCING CEMENTITIOUS COMPOSITIONS HAVING GOOD FLUIDITY AND HIGH EARLY COMPRESSIVE STRENGTH

(75) Inventors: Pepi Peev, Carrolton, TX (US); Russell L. Hill, San Antonio, TX (US)

(73) Assignee: The Euclid Chemical Company, Cleveland, OH (US)

( * ) Notice: Subject to any disclaimer, the term of this patent is extended or adjusted under 35 U.S.C. 154(b) by 0 days.

(21) Appl. No.: 10/308,633

(22) Filed: Dec. 3, 2002

(65) Prior Publication Data

US 2003/0167973 A1 Sep. 11, 2003

Related U.S. Application Data

(60) Provisional application No. 60/346,992, filed on Jan. 8, 2002.

(51) Int. Cl.$^7$ ................................................ C04B 24/24
(52) U.S. Cl. ...................... 106/808; 106/708; 106/724; 106/727; 106/802; 106/823; 524/5
(58) Field of Search ................................ 106/708, 724, 106/727, 802, 808, 823; 524/5

(56) References Cited

U.S. PATENT DOCUMENTS

| | | |
|---|---|---|
| 3,782,991 A | 1/1974 | Burge |
| 4,256,500 A | 3/1981 | Turpin, Jr. |
| 4,298,392 A | 11/1981 | Isselmann |
| 4,373,956 A | 2/1983 | Rosskopf |
| 4,473,405 A | 9/1984 | Gerber |
| 4,519,842 A | 5/1985 | Gerber |
| 5,176,753 A * | 1/1993 | Brook ........................ 106/819 |
| RE35,194 E | 4/1996 | Gerber |
| 5,707,445 A | 1/1998 | Yamato et al. |
| 5,792,252 A | 8/1998 | Sprouts |
| 5,798,425 A | 8/1998 | Albrecht et al. |
| 5,840,114 A | 11/1998 | Jeknavorian et al. |
| 5,919,300 A | 7/1999 | Bürge et al. |
| 5,968,256 A * | 10/1999 | Leikauf ....................... 106/727 |
| 5,997,630 A * | 12/1999 | Angelskar et al. .......... 106/696 |
| 2001/0053804 A1 * | 12/2001 | Widmer et al. ................. 524/5 |

* cited by examiner

Primary Examiner—Anthony J. Green
(74) Attorney, Agent, or Firm—Calfee, Halter & Griswold LLP

(57) ABSTRACT

The present invention is an admixture for cementitious compositions that provides both good flowability and high early strength as is desired in the art. The admixture of the invention includes a superplasticizer comprising a water-soluble modified acrylic copolymer and at least one accelerant selected from the group consisting of salts of thiocyanic acid, water-soluble alkanolamines, ethylene oxide adducts of ethylenediamine, and morpholine derivatives. The combination of the superplasticizer and the accelerant used in the invention surprisingly has a synergistic effect on the early compressive strength of the cementitious composition and also enhances the W/CM ratio and the flowability of the cementitious composition.

16 Claims, No Drawings

ADMIXTURE FOR PRODUCING CEMENTITIOUS COMPOSITIONS HAVING GOOD FLUIDITY AND HIGH EARLY COMPRESSIVE STRENGTH

CROSS-REFERENCE TO RELATED APPLICATIONS

This application is related to commonly owned co-pending provisional application Serial No. 60/346,992, filed Jan. 8, 2002, and claims the benefit of the earlier filing date of this application under 35 U.S.C. §119(e).

FIELD OF THE INVENTION

This invention relates to an admixture for incorporation into hydraulic cement, mixtures that optionally include SCM's, such as concrete, grouts, mortars, patching compounds and dry mixes for making the same, to produce cementitious compositions having high fluidity and high early compressive strength.

BACKGROUND OF THE INVENTION

In many applications, such as pre-cast concrete, it is desirable that the cementitious composition used has sufficient fluidity so as to flow freely through and around the reinforcement structure to fill out the mold and level off at the top of the mold. Typically, the mold needs to be vibrated to facilitate the leveling of the concrete, which uses energy and time. Equally important as this need for high flowability, however, is the need for high early strength. The term "early strength" refers to the compressive strength of the cementitious mass within the first twenty-four hours after mixing the cement mixture with water. Since the goal in this industry has been to reduce the time for demolding as much as possible, it has been particularly desirable to provide cementitious compositions that have a compressive strength within 13 and 17 hours that allows for demolding.

Certain chemical additives have been used in the art to improve the flowability and/or early strength of cementitious compositions. Calcium chloride, for instance, has been used as an effective and economic accelerator especially at low temperatures. Nevertheless, the conventional use of calcium chloride has been restricted because it promotes the corrosion of metal reinforcement at the levels at which it is included in the cementitious composition. Furthermore, at the lower application levels at which the calcium chloride is not corrosive, it is ineffective. Other inorganic salts as well as amines have also been used as accelerators, however they all provide little, if any, benefit on the fluidity of the cementitious composition. On the other hand, increased fluidity can be achieved by using large amounts of water in the concrete but the resulting cementitious structure exhibits insufficient compactness, is prone to cracking and has poor compressive strength.

Another method for increasing the fluidity of the cementitious composition is to add superplasticizers or high range water-reducers (HRWR's) like sulphonated melamine- or naphthalene-formaldehyde polycondensates or ligninsulphonate-based admixtures. More recently, HRWR's based on water-soluble polycarboxylic acid salts, e.g., alkoxylated copolymers of acrylic acid and acrylic esters have been proposed for imparting high water reduction at lower dosages. These copolymers typically have a poly(oxyethylene) chain connected to the acrylic backbone of the copolymer via ester bonds and have conventionally been used as dispersing agents. The strong water reducing capacity of both the conventional naphthalene/melamine superplasticizers and the new generation superplasticizers can be used to effectively lower the ratio of the water to the cementitious material in a concrete mixture and thus provide increased compressive strength at both early and later ages. However, although these superplasticizers can be used to increase the early compressive strength of the cementitious composition, there is a need in the art to further increase the early compressive strength of the cementitious composition while still providing good flowability.

SUMMARY OF THE INVENTION

The present invention is an admixture for cementitious compositions that provides both good flowability and high early strength as is desired in the art. In addition, the admixture of the invention does not possess the drawbacks of conventional additives used in cementitious compositions. For example, the admixture is chloride free and thus does not have the tendency to corrode metal equipment. The admixture used in the invention also lowers the water-to-cementitious (W/CM) ratio of the cementitious composition. Furthermore, the admixture uses a low dose of organic accelerants, especially compared to the amount of inorganic accelerants conventionally used in the art.

The admixture of the invention includes a superplasticizer comprising a water-soluble modified acrylic copolymer and at least one accelerant selected from the group consisting of salts of thiocyanic acid, water-soluble alkanolamines, ethylene oxide adducts of ethylenediamine, and morpholine derivatives. Preferably, the accelerant includes a salt of thiocyanic acid and water-soluble alkanolamine. More preferably, the accelerant includes each of a salt of thiocyanic acid, a water-soluble alkanolamine, ethylene oxide adducts of ethylenediamine, and morpholine derivatives. The combination of the superplasticizer and the accelerant used in the invention surprisingly has a synergistic effect on the early compressive strength of the cementitious composition and also enhances the fluidity of the cementitious composition allowing for increased reduction in water demand and the use of a lower W/CM ratio in practical applications.

The superplasticizer and accelerant are included in a cementitious mixture comprising a hydraulic cement and optionally a supplementary cementitious material (SCM) and is combined with aggregate and water to produce the cementitious composition. The water is included in an amount sufficient to effect hydraulic setting of the cementitious composition. The hydraulic cement is preferably Portland cement. The SCM is preferably fly ash, ground granulated blast furnace (i.e. slag), and/or silica fume and is more preferably fly ash. The accelerant preferably includes an alkali metal, ammonium or alkaline earth metal salt of thiocyanic acid; a water-soluble poly(hydroxyalkyl)polyethyleneamine; ethylene oxide adducts of ethylenediamine; and a composition of morpholine derivatives. More preferably, the salt of thiocyanic acid is selected from the group consisting of sodium, potassium, ammonium, calcium and magnesium thiocyanates (e.g. sodium thiocyanate); the water-soluble poly(hydroxyalkyl)polyethyleneamine is tetra (hydroxyethyl)ethylenediamine; the ethylene oxide adducts are selected from the group consisting of sym-dihydroxyethylethylenediamine, unsym-dihydroxyethylethylenediamine, aminoethylethanolamine, trihydroxyethylethylenediamine and tetrahydroxyethylethylenediamine (e.g. tetra(hydroxyethyl)ethylenediamine); and the morpholine derivatives are selected from the group consisting of morpholineaminodiglycol, morpholinyldiglycol, dimorpholinoethane, dimorpholinediglycol, methoxymethylmorpholine, morpholine ethaneamine and morpholine ethanol. The superplasticizer and the at least one accelerant are typically present in amounts sufficient to provide an early compressive strength at 13 hours after application that is greater than or equal to 200% percent of the early compressive strength of a comparable composition that does not include the superplasticizer or accelerant. Moreover, the at least one accelerant is typically present in an amount sufficient to generally provide an early compressive strength at 13 hours after application that is greater than or equal to 30% percent, more preferably greater than or equal to 50%, of the early compressive strength of a comparable composition that does not include the accelerant. The accelerant typically includes the salt of thiocyanic acid in an amount from about 0.005% to about 1% by weight; the water-soluble poly(hydroxyalkyl)polyethyleneamine in an amount from about 0.004% to about 0.5% by weight; the ethylene oxide adducts of ethylenediamine in an amount from about 0.0001% to about 0.08% by weight; and the morpholine derivatives in an amount from about 0.0004% to about 0.35% by weight, based on the total cementitious content (i.e. cement and SCM). The water-soluble modified acrylic copolymer is present in an amount from 0.03% to about 0.4% by weight based on the total cementitious content. In a preferred embodiment, the cement mixture preferably includes Portland cement in an amount from about 50% to about 100% by weight and the SCM in an amount from greater than 0% to about 50% by weight.

In a preferred embodiment, the present invention includes a cementitious composition comprising (1) a cementitious mixture comprising Portland cement in an amount from about 60% to about 100% by weight based on the total cementitious content; fly ash in an amount from greater than 0% to about 40% by weight based on the total cementitious content; a water-soluble modified acrylic copolymer superplasticizer in an amount from 0.03% to about 0.4% by weight based on the total cementitious content; an accelerating composition comprising a salt of a thiocyanic acid in an amount from about 0.005% to about 1% by weight, a water-soluble poly(hydroxyalkyl)polyethyleneamine in an amount from about 0.004% to about 0.5% by weight, ethylene oxide adducts of ethylenediamine in an amount from about 0.0001% to about 0.08% by weight; and morpholine derivatives in an amount from about 0.0004% to about 0.35% by weight, based on the total cementitious content; (2) aggregate in an amount from greater than 0% to about 80% by weight based on the total cementitious content; and (3) a sufficient amount of water to effect hydraulic setting of the cementitious composition.

The present invention also includes a method for obtaining high early strength and increasing the flow of a cementitious composition, comprising the steps of combining a hydraulic cement; an optional SCM; a superplasticizer comprising a water-soluble modified acrylic copolymer; at least one accelerant selected from the group consisting of salts of thiocyanic acid, water-soluble alkanolamines, ethylene oxide adducts of ethylenediamine, and morpholine derivatives, aggregate and a sufficient amount of water to effect hydraulic setting of the cementitious composition. Preferably, the cementitious composition is formed by sequentially adding the aggregate, 50–80% of the water, the cementitious material (cement and SCM), the remaining water and the admixture.

These and other features and advantages of the present invention will become more readily apparent to those skilled in the art upon consideration of the following detailed description, which describe both the preferred and alternative embodiments of the present invention.

DETAILED DESCRIPTION OF THE PREFERRED EMBODIMENTS

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. The term "comprising" as used herein is used synonymously with the term "including" and is an open, non-limiting term.

The cementitious composition of the invention includes a cementitious mixture, aggregate and water. The aggregate is typically present in the cementitious composition in an amount from greater than 0% to about 80% by weight based on the total cementitious content (i.e. the weight of the cement and SCM). Typical aggregates include granite, limestone, sand, greywacke, river rock and various other aggregate types. The water is present in an amount sufficient to effect hydraulic setting of the cementitious composition.

The cementitious mixture includes a hydraulic cement, an optional SCM, a superplasticizer and at least one accelerant in accordance with the invention. The hydraulic cement is preferably Portland cement. The SCM has pozzolanic or hydraulic properties and can be Class C or F fly ash, ground granulated blast furnace (i.e. slag), silica fume, microsilica, calcined metakaolin or a natural pozzolan. Preferably, the SCM includes fly ash. Preferably, the cement mixture includes Portland cement in an amount from about 60% to about 100% by weight and fly ash in an amount from greater than 0% to about 40% by weight of the cement mixture. The superplasticizer and the at least one accelerant are typically present in amounts sufficient to provide an early compressive strength at 13 hours after application that is greater than or equal to 200% percent of the early compressive strength of a comparable composition that does not include the superplasticizer or accelerant. Moreover, the at least one accelerant is typically present in an amount sufficient to generally provide an early compressive strength at 13 hours after application that is greater than or equal to 30% percent, more preferably greater than or equal to 50%, of the early compressive strength of a comparable composition that does not include the accelerant.

The superplasticizer or high range water reducer (HRWR) comprises a water-soluble polycarboxylic acid salt, e.g., a copolymer formed from monomers including acrylic or methacrylic acid and acrylic or methacrylic acid esters that has been modified to be water-soluble (e.g. using oxyalkylene groups such as oxyethylene or oxypropylene groups). Suitable superplasticizers for use in the invention include DILOFLO® superplasticizers commercially available from GEO Specialty Chemicals. The superplasticizer imparts high water reduction (e.g. 12 to 25%) to the cementitious composition at low dosages. For example, the water-soluble modified acrylic copolymer is present in an amount from 0.03% to about 0.4% by weight based on the total cementitious content.

The admixture includes at least one accelerant selected from the group consisting of salts of thiocyanic acid, water-soluble alkanolamines, ethylene oxide adducts of ethylenediamine, and morpholine derivatives. Preferably, the admixture includes a thiocyanic salt and a water-soluble alkanolamine. More preferably, the accelerant includes each of a salt of thiocyanic acid, a water-soluble alkanolamine, an ethylene oxide adduct of ethylenediamine, and a morpholine derivative. These accelerants are provided in amounts that are lower than the amounts of inorganic accelerants conventionally used in cementitious compositions. In particular, the accelerants are typically present in the cementitious composition of the invention in an amount up to about 0.3% by weight, more preferably from about 0.02% to 0.26% by weight based on the total cementitious content.

The thiocyanic acid salt is preferably selected from the group consisting of alkali metal, ammonium or alkaline earth metal salts of thiocyanic acid such as sodium, potassium, ammonium, calcium and magnesium thiocyanates. More preferably, the thiocyanic acid salt includes sodium thiocyanate. The thiocyanic acid salt is typically present in an amount from about 0.005% to about 1% by weight, more preferably about 0.01% to about 0.6% by weight, based on the total cementitious content. At these application rates, the thiocyanic acid salts advantageously do not have a corrosive effect on metal structures.

The water-soluble alkanolamine is preferably a water-soluble poly(hydroxyalkyl)polyethyleneamine. More preferably, the water-soluble poly(hydroxyalkyl)polyethyleneamine is tetra(hydroxyethyl)ethylenediamine. The water-soluble alkanolamine is present in an amount from about 0.004% to about 0.5% by weight, more preferably about 0.015% to about 0.3% by weight, based on the total cementitious content.

The ethylene oxide adducts of ethylenediamine (EDA) used in the admixture are preferably selected from the group consisting of sym-dihydroxyethylethylenediamine, unsym-dihydroxyethylethylenediamine, aminoethylethanolamine, trihydroxyethylethylenediamine and tetrahydroxyethylethylenediamine. More preferably, the ethylene oxide adducts of ethylenediamine includes ethylene oxide adducts of tetra(hydroxyethyl)ethylenediamine). The ethylene oxide adducts of ethylenediamine are present in the cementitious composition in an amount from about 0.0001% to about 0.08% by weight, more preferably about 0.002% to about 0.05% by weight, based on the total cementitious content.

The morpholine derivatives used in the admixture are preferably selected from the group consisting of morpholineaminodiglycol, morpholinyldiglycol, dimorpholinoethane, dimorpholinediglycol, methoxymethylmorpholine, morpholine ethaneamine and morpholine ethanol. The morpholine derivatives are typically heavy co-products from the production of morpholine. The morpholine derivatives are present in the cementitious composition in an amount from about 0.0004% to about 0.35% by weight, more preferably about 0.008% to about 0.2% by weight, based on the total cementitious content.

In addition to the above components, the cementitious mixture can also include other additives such as air-entraining agents as would be understood by those skilled in the art. In addition, fibers or other functional fillers can be added.

The cementitious compositions of the invention are prepared by combining a hydraulic cement; an optional SCM; a superplasticizer comprising a water-soluble modified acrylic copolymer; at least one accelerant selected from the group consisting of salts of thiocyanic acid, water-soluble alkanolamines, ethylene oxide adducts of ethylenediamine, and morpholine derivatives; aggregate; and a sufficient amount of water to effect hydraulic setting of the cementitious composition. Preferably, the superplasticizer and accelerant are added together as a one-component admixture with a small amount of water to the hydraulic cement and the SCM to form the cementitious mixture. The admixture is added in an amount from about 0.1% to about 0.8% by weight, more preferably about 0.2% to about 0.6% by weight, based on the total cementitious content. The cementitious mixture is then combined with aggregate and water to form the cementitious composition. Although the order of addition is not critical, the cementitious composition is preferably formed by sequentially adding the aggregate, 50–80% of the water, the cementitious material (cement and SCM), the remaining water and the admixture. The hydraulic cement, SCM, superplasticizer and accelerants can also be provided as a dry mixture that is combined with the aggregate and water to produce the cementitious composition. As mentioned above, the admixture imparts excellent early strength and good flowability to the cementitious composition.

The present invention will now be further described by the following non-limiting examples.

EXAMPLE 1

The advantages of the present invention have been demonstrated in concrete mixes by combining the accelerants discussed above with the HRWR of the invention and with a conventional HRWR. To obtain results in a broad spectrum seven different brands and two types of cement were tested. The concrete mixes were prepared and tested according to the following ASTM methods:

| | |
|---|---|
| ASTM C 192 | Practice for Making and Curing Concrete Test Specimens in the Laboratory; |
| ASTM C 39 | Standard Test Method for Compressive Strength of Cylindrical Concrete Specimens; |
| ASTM C 1064 | Standard Test Method for Temperature of Freshly Mixed Portland Cement Concrete; |
| ASTM C 138 | Standard Test Method for Unit Weight, Yield, and Air Content (Gravimetric) of Concrete; |
| ASTM C 143 | Standard Test Method for Slump of Hydraulic Cement Concrete; |
| ASTM C 231 | Standard Test Method for Air Content of Freshly Mixed Concrete by the Pressure Method; and |
| ASTM C 403 | Standard Test Method for Time of Setting of Concrete Mixtures by Penetration Resistance. |

The performance of the admixture of the invention was tested against cementitious compositions that included no HRWR's or accelerants and cementitious compositions containing only HRWR's. The accelerants consisted of 71.4% sodium thiocyanate, 17.9% tetra(hydroxyethyl) polyethyleneamine, 2.1% ethylene oxide adducts of ethylenediamine and 8.5% morpholine derivatives (on a per weight basis).

In the tests, the control included no HRWR's and no accelerants. XP-PC represents compositions that included a water-soluble modified acrylic copolymer in accordance with the invention (DILOFLO® 21) as a superplasticizer at the conventional dose of 0.2% by weight based on the weight of the cement. PP-X represents compositions that included the XP-PC plasticizer at a dose of 0.2% by weight in combination with the accelerants of the invention at a dose of 0.23% by weight. SP represents compositions that included a conventional naphthalene formaldehyde sulfonate (NFS) (DISAL® commercially available from Handy Chemicals) as a superplasticizer at the conventional dose of 0.5% by weight based on the weight of the cement. PP-N represents compositions that included the SP plasticizer at a dose of 0.5% by weight in combination with the accelerants of the invention at a dose of 0.14% by weight. The decrease in water-to-cement ratio from the control to each of the samples is provided for each sample where a control was also tested. The increases resulting from the presence of the accelerants are provided after the compressive strengths in the PP-X and PP-N columns. The mix design for all tests was the same, e.g. cement 700 lb/yd$^3$ (415 kg/m$^3$), 1750 lb/yd$^3$ (1042 kg/m$^3$) of coarse aggregate and 7–8" (18–20 cm) slump for the control. The test specimens were 4"×8" (10 cm×20 cm) cylinders and compressive strength measurements were made at 13 h, 17 h, 21 h, 7 days and 28 days. The test results are provided in Tables 1–5 below. All percentages are on a per weight basis based on the weight of the cement mixture.

TABLE 1

CEMENT A

| | Control | XP-PC | PP-X | SP | PP-N |
|---|---|---|---|---|---|
| Dose, solids % | | 0.2 | 0.43 | 0.5 | 0.64 |
| Oz/cwt | | 6.57 | 11.51 | 16.63 | 19.04 |
| Test Results: | | | | | |
| Slump, in. | | 8.5 | 8 | 8 | 9.25 |
| W/CM Ratio | | 0.466 | 0.371 | 0.377 | 0.392 |
| Compressive strength, psi | | | | | |
| 13 h | | 1940 | 3240 (67%) | 2210 | 3130 (42%) |
| 17 h | | 2250 | 3700 (64%) | 2900 | 3340 (15%) |
| 21 h | | 2750 | 4110 (49%) | 3370 | 3990 (18%) |
| 7 days | | 5810 | 6700 (15%) | 6650 | 6790 (2%) |
| 28 days | | 6860 | 8300 (21%) | 7320 | 7880 (8%) |

TABLE 2

CEMENT B

| | Control | XP-PC | PP-X | SP | PP-N |
|---|---|---|---|---|---|
| Dose, solids % | | 0.2 | 0.43 | 0.5 | 0.64 |
| Oz/cwt | | 6.57 | 11.51 | 16.63 | 19.04 |
| Test Results: | | | | | |
| Slump, in. | 7.5 | 7.75 | 8.75 | 7.75 | 8.25 |
| W/CM Ratio | 0.53 | 0.43 (19%) | 0.37 (30%) | 0.41 (22.4%) | 0.41 (22.4%) |
| Compressive strength, psi | | | | | |
| 13 h | 1610 | 3090 | 4080 (32%) | 2870 | 3050 (6%) |
| 17 h | 2130 | 3790 | 4580 (21%) | 3680 | 3990 (8%) |
| 21 h | 2415 | 4130 | 5000 (21%) | 4040 | 4570 (13%) |
| 7 days | 4760 | 6330 | 6860 (8%) | 6360 | 6810 (7%) |
| 28 days | 5840 | 7450 | 7970 (7%) | 7230 | 7460 (3%) |

TABLE 3

CEMENT C

| | Control | XP-PC | PP-X | SP | PP-N |
|---|---|---|---|---|---|
| Dose, solids % | | 0.2 | 0.43 | 0.5 | 0.64 |
| Solids, % | | 42.88 | 49.47 | 38.84 | 42.64 |
| Oz/cwt | | 6.57 | 11.51 | 16.63 | 19.04 |
| Test Results: | | | | | |
| Slump, in. | 7.25 | 7.00 | 8.50 | 7.75 | 8 |
| W/CM Ratio | 0.52 | 0.39 (25%) | 0.35 (33%) | 0.33 (36%) | 0.40 (23%) |
| Compressive strength, psi | | | | | |
| 13 h | 880 | 2320 | 3480 (66%) | 2020 | 2120 (5%) |
| 17 h | 1160 | 3060 | 4010 (31%) | 2840 | 3040 (7%) |
| 21 h | 1350 | 3300 | 4310 (31%) | 3120 | 3680 (18%) |
| 7 days | 3630 | 6740 | 7350 (9%) | 6450 | 6270 (-3%) |
| 28 days | 5760 | 7780 | 7900 (1.5%) | 7240 | 7230 (0%) |

TABLE 4

CEMENT D

| | Control | XP-PC | PP-X | SP | PP-N |
|---|---|---|---|---|---|
| Dose, solids % | | 0.2 | 0.43 | 0.5 | 0.64 |
| Oz/cwt | | 6.57 | 11.51 | 16.63 | 19.04 |
| Test results: | | | | | |
| Slump, in. | 8 | 6 | 4.5 | 7 | 7 |
| W/CM | 0.51 | 0.39 (24%) | 0.39 (24%) | 0.47 (8%) | 0.42 (18%) |
| Compressive strength, psi | | | | | |
| 13 h | 610 | 1050 | 1800 (71%) | 770 | 970 (26%) |
| 17 h | 880 | 1680 | 2810 (68%) | 1290 | 1720 (33%) |
| 21 h | 1090 | 2200 | 3150 (43%) | 1750 | 2450 (40%) |
| 7 days | 3310 | 4720 | 5540 (17%) | 4520 | 5550 (23%) |
| 28 days | 4700 | 5860 | 6810 (17%) | 5680 | 6650 (17%) |

TABLE 5

CEMENT E

| | Control | XP-PC | PP-X | SP | PP-N |
|---|---|---|---|---|---|
| Dose, solids % | | 0.2 | 0.43 | 0.5 | 0.64 |
| Oz/cwt | | 6.57 | 11.51 | 16.63 | 19.04 |
| Test results: | | | | | |
| Slump, in. | 7.25 | 9 | 7 | 9.25 | 9 |
| W/CM | 0.55 | 0.46 (16.4%) | 0.44 (20%) | 0.44 (20%) | 0.42 (23.6%) |
| Compressive strength, psi | | | | | |
| 13 h | 1760 | 3310 | 4350 (31%) | 3110 | 3850 (24%) |
| 17 h | 2250 | 3940 | 4720 (20%) | 3990 | 4800 (20%) |

TABLE 5-continued

| | CEMENT E | | | | |
|---|---|---|---|---|---|
| | Control | XP-PC | PP-X | SP | PP-N |
| 21 h | 2500 | 4200 | 4760 (13%) | 4370 | 5220 (19%) |
| 7 days | 4360 | 5100 | 6680 (31%) | 6110 | 6420 (5%) |
| 28 days | 5280 | 6580 | 7340 (11%) | 6790 | 7240 (7%) |

As shown by the above examples, the accelerants of the invention produce synergistic results with the superplasticizer of the invention as evidenced by the significant increases in early compressive strength, particularly at 13 h, 17 h and 21 h, when compared to the modest increases resulting from the use of the accelerants of the invention with conventional naphthalene based superplasticizers. In addition, the accelerants of the invention provided much more significant decreases in water content (as shown by the decreases in the water-to-cement ratio) when combined with the superplasticizer of the invention than resulted when the accelerants were combined with the conventional naphthalene-based superplasticizer.

EXAMPLE 2

Tests were also conducted to compare compositions including the HRWR of the invention with and without the accelerants described in Example 1 and using Cement A cement. The results are provided in Tables 6 and 7 below.

a conventional HRWR. The concrete mixes were prepared and tested according to the ASTM methods described in Example 1.

The performance of the admixture of the invention was tested against cementitious compositions that included no HRWR's or accelerants and cementitious compositions containing only HRWR'S. The accelerants consisted of 71.4% sodium thiocyanate, 17.9% tetra(hydroxyethyl) polyethyleneamine, 2.1% ethylene oxide adducts of ethylenediamine and 8.5% morpholine derivatives (on a per weight basis).

In the tests, the control included no HRWR's and no accelerants. XP-PC represents compositions that included a water-soluble modified acrylic copolymer in accordance with the invention (DILOFLO® 21) as a superplasticizer at the conventional dose of 0.2% by weight based on the weight of the cement. PP-X represents compositions that included the XP-PC plasticizer at a dose of 0.2% by weight in combination with the accelerants of the invention at a dose of 0.23% by weight. SP represents compositions that included a conventional naphthalene formaldehyde sulfonate (NFS) (DISAL® commercially available from Handy Chemicals) as a superplasticizer at the conventional dose of 0.5% by weight based on the weight of the cement. PP-N represents compositions that included the SP plasticizer at a dose of 0.5% by weight in combination with the accelerants of the invention at a dose of 0.23% by weight. The decrease in water-to-cement ratio from the control to each of the samples is provided for each sample where a control was also tested. The increases resulting from the presence of the accelerants are provided after the compressive strengths in the PP-X and PP-N columns. Each of the tests included 700

TABLE 6

| | Ctrl. | XP-PC | | | PPX | | |
|---|---|---|---|---|---|---|---|
| Mix I.D. | 1 | 2 | 3 | 4 | 5 | 6 | 7 |
| Cement (lbs.) | 700 | 700 | 700 | 700 | 700 | 700 | 700 |
| 3/4 inch Crushed Limestone (lbs.) | 1,750 | 1,750 | 1,750 | 1,750 | 1,750 | 1,750 | 1,750 |
| River Sand (lbs.) | 1,211 | 1,276 | 1,302 | 1,328 | 1,289 | 1,315 | 1,341 |
| Water (lbs.) | 343 | 295 | 285 | 266 | 280 | 265 | 250 |
| W/CM Ratio | 0.49 | 0.42 | 0.41 | 0.38 | 0.4 | 0.38 | 0.36 |
| Plasticizer (wt/wt cementitious | — | 0.12 | 0.20 | 0.28 | 0.12 | 0.20 | 0.28 |
| Accelerants (wt/wt cementitious) | — | — | — | — | 0.14 | 0.23 | 0.32 |
| Slump (inch) | 7.50 | 7.75 | 9.25 | 9.25 | 8.75 | 9.00 | 9.00 |
| Air Content (%) | 1.20 | 2.50 | 0.80 | 0.60 | 1.90 | 1.60 | 1.30 |
| Unit Weight (lb/ft$^3$) | 146.3 | 145.7 | 149.0 | 150.3 | 148.0 | 149.0 | 150.4 |
| Temperature (Degrees F.) | 60 | 60 | 61 | 61 | 62 | 62 | 62 |
| Set Time: (Hr:Min) | | | | | | | |
| Initial: | 5:10 | 4:50 | 5:12 | 4:31 | 4:22 | 4:16 | 3:58 |
| Final: | 6:43 | 6:30 | 6:43 | 5:58 | 5:41 | 5:37 | 5:20 |
| Compressive Strength, psi: (avg. of 2) | | | | | | | |
| 13 hrs. | 1090 | 1590 | 1970 | 3240 | 3000 | 3580 | 3940 |
| 17 hrs. | 1790 | 2340 | 3110 | 4460 | 4180 | 5010 | 5250 |
| 21 hrs. | 2050 | 3000 | 3940 | 5110 | 4710 | 5530 | 5690 |
| 7 Days | 5480 | 6450 | 7410 | 9120 | 7870 | 8810 | 9500 |
| 28 Days | 7160 | 9550 | 10500 | 10860 | 7720 | 9270 | 10700 |

EXAMPLE 3

Additional tests were conducted in the manner described in Example 1 to demonstrate the advantages of the present invention in concrete mixes by combining the accelerants discussed above with the HRWR of the invention and with lb/yd$^3$ (415 kg/m$^3$) cement and 1750 lb/yd$^3$ (1042 kg/m$^3$) of coarse aggregate. The amount of sand used in the control was 1118 lb/yd$^3$ (663 kg/m$^3$) and the amount of sand used in the other tests was 1274 lb/yd$^3$ (755 kg/m$^3$). The test specimens were cylinders 4"×8" (10 cm×20 cm) and compressive strength measurements were made at 13 h, 17 h, 21 h, 7 days and 28 days. The test results are provided in Tables 7–9 below. All percentages are on a per weight basis based on the weight of the cement mixture.

TABLE 7

| | | CEMENT A | | | |
|---|---|---|---|---|---|
| | Control | XP-PC | PP-X | SP | PP-N |
| Dose, solids % | | 0.2 | 0.43 | 0.5 | 0.73 |
| Oz/cwt | | 6.5 | 11.5 | 16.6 | 21.4 |
| Test Results: | | | | | |
| Slum, in. | 7.0 | 8.75 | 8.5 | 8.5 | 8.75 |
| W/CM Ratio | 0.449 | 0.334 (26%) | 0.357 (20%) | 0.322 (28%) | 0.349 (22%) |
| Air % | 1.5 | 1.1 | 1.4 | 1.1 | 1.1 |
| Unit Weight lb/ft³ | 147.2 | 151.4 | 152.2 | 151.6 | 152.8 |
| Set Time (h:min) | | | | | |
| Initial | 4:50 | 4:35 | 3:55 | 6:35 | 7:45 |
| Final | 6:05 | 6:05 | 5:10 | 7:55 | 9:30 |
| Compressive strength, psi | | | | | |
| 13 h | 1330 | 2610 | 3890 (49%) | 1370 | 720 (−47%) |
| 17 h | 1980 | 4300 | 5130 (19%) | 3150 | 2170 (−31%) |
| 21 h | 2560 | 5010 | 5450 (9%) | 4410 | 3200 (−27%) |
| 7 days | 6840 | 8810 | 8470 (−4%) | 8380 | 7110 (−15%) |
| 28 days | 8210 | 10900 | 9920 (−9%) | 9710 | 8150 (−16%) |

As shown above, the accelerants when added to the XP-PC plasticizer in accordance with the invention significantly increased the early strength of the concrete and allowed it to be used sooner. The accelerant, on the other hand, not only failed to significantly increase the early strength of the concrete using SP superplasticizer, but actually decreased the early strength of the concrete.

TABLE 8

| | | CEMENT F | | | |
|---|---|---|---|---|---|
| | Control | XP-PC | PP-X | SP | PP-N |
| Dose, solids % | | 0.2 | 0.43 | 0.5 | 0.73 |
| Oz/cwt | | 6.5 | 11.5 | 16.6 | 21.4 |
| Test Results: | | | | | |
| Slump, in. | 7.0 | 8.5 | 7.75 | 8.5 | 7.50 |
| W/CM Ratio | 0.516 | 0.319 (38%) | 0.361 (30%) | 0.322 (38%) | 0.349 (32%) |
| Air % | 1.4 | 2.8 | 2.2 | 0.9 | 1.9 |
| Unit Weight lb/ft³ | 146.8 | 148.8 | 150.2 | 153.0 | 150.8 |
| Set Time (h:min) | | | | | |
| Initial | 3:45 | 3:40 | 3:10 | 5:35 | 5:10 |
| Final | 4:45 | 4:50 | 4:15 | 6:50 | 6:25 |
| Compressive strength, psi | | | | | |
| 13 h | 860 | 3280 | 3280 (0%) | 1830 | 2370 (29%) |
| 17 h | 1430 | 4260 | 4250 (0%) | 3140 | 3620 (15%) |
| 21 h | 1720 | 5190 | 4720 (−9%) | 4250 | 3980 (−6%) |
| 7 days | 5340 | 7990 | 8440 (6%) | 8440 | 8440 (0%) |
| 28 days | 6920 | 9600 | 9400 (−2%) | 9640 | 9550 (−1%) |

It is noted that the accelerants of the invention when used with Cement F did not increase the early strength of the concrete that included the XP-PC plasticizer. Although this effect was different than the substantial increases that were witnessed when the other cements were tested, it is normal that not all cements react the same way with additives. Furthermore, it is noted that for the concrete that included the XP-PC plasticizer without the accelerants of the invention, the early compressive strength values were very high (much higher than the SP and PP-N concretes) and thus further increases would not necessarily be expected for the XP-PC concrete.

TABLE 9

| | | CEMENT B | | | |
|---|---|---|---|---|---|
| | Control | XP-PC | PP-X | SP | PP-N |
| Dose, solids % | | 0.2 | 0.43 | 0.5 | 0.73 |
| Oz/cwt | | 6.5 | 11.5 | 16.6 | 21.4 |
| Test Results: | | | | | |
| Slump, in. | 7.25 | 8.0 | 7.25 | 8.75 | 8.0 |
| W/CM Ratio | 0.497 | 0.375 (25%) | 0.371 (25%) | 0.342 (31%) | 0.369 (26%) |
| Air % | 1.1 | 2.4 | 2.2 | 0.9 | 1.4 |
| Unit Weight lb/ft³ | 146.6 | 147.4 | 149.2 | 152.2 | 151.0 |
| Set Time (h:min) | | | | | |
| Initial | 4:10 | 3:50 | 3:15 | 5:15 | 6:20 |
| Final | 6:05 | 4:50 | 4:20 | 6:15 | 7:25 |
| Compressive strength, psi | | | | | |
| 13 h | 1210 | 3490 | 4590 (32%) | 1990 | 1950 (−2%) |
| 17h | 2250 | 4580 | 5750 (26%) | 3620 | 3450 (−5%) |
| 21 h | 2750 | 5200 | 5920 (14%) | 4770 | 4450 (−7%) |
| 7 days | 6280 | 8160 | 9090 (11%) | 8760 | 8690 (−1%) |
| 28 days | 7890 | 9860 | 10170 (3%) | 10980 | 9690 (−12%) |

As shown above, the accelerants when added to the XP-PC plasticizer in accordance with the invention significantly increased the early strength of the concrete and allowed it to be used sooner. The accelerant, on the other hand, not only failed to significantly increase the early strength of the concrete using SP superplasticizer, but actually decreased the early strength of the concrete.

As shown by the above examples, the accelerants of the invention produce synergistic results with the superplasticizer of the invention as evidenced by the significant increases that generally occurred in early compressive strength, particularly at 13 h, 17 h and 21 h, when compared to the modest increases (and often decreases) resulting from the use of the accelerants of the invention with conventional naphthalene based superplasticizers. In addition, the accelerants of the invention generally provided much more significant decreases in water content (as shown by the decreases in the water-to-cement ratio) when combined with the superplasticizer of the invention than resulted when the accelerants were combined with the conventional naphthalene-based superplasticizer.

The admixture of the invention can be incorporated into various cementitious compositions that include hydraulic cements, and optionally SCM's, such as concrete, grouts, mortars, patching compounds and dry mixes for making the same, and can be combined with aggregate and water to produce cementitious compositions having high fluidity and high early compressive strength.

It is understood that upon reading the above description of the present invention and reviewing the accompanying drawings, one skilled in the art could make changes and variations therefrom. These changes and variations are included in the spirit and scope of the following appended claims.

That which is claimed:

1. A cementitious composition comprising:
   a cementitious mixture comprising:
      a hydraulic cement;
      a superplasticizer comprising a water-soluble modified acrylic copolymer; and
      at least one accelerant selected from the group consisting of salts of thiocyanic acid, water-soluble alkanolamines, ethylene oxide adducts of ethylenediamine, and morpholine derivatives;
   aggregate; and
   a sufficient amount of water to effect hydraulic setting of the cementitious composition.

2. The cementitious composition according to claim 1, further comprising a SCM.

3. The cementitious composition according to claim 1, wherein the hydraulic cement is Portland cement.

4. The cementitious composition according to claim 1, wherein the accelerant includes a thiocyanic acid salt and a water-soluble alkanolamine.

5. The cementitious composition according to claim 1, wherein the accelerant includes a salt of thiocyanic acid, a water-soluble alkanolamine, an ethylene oxide adduct of ethylenediamine, and a morpholine derivative.

6. The cementitious composition according to claim 5, wherein the accelerant includes an alkali metal, ammonium or alkaline earth metal salt of thiocyanic acid; a water-soluble poly(hydroxyalkyl)polyethyleneamine; ethylene oxide adducts of ethylenediamine; and a composition of morpholine derivatives.

7. The cementitious composition according to claim 6, wherein said salt of thiocyanic acid is present in an amount from about 0.005% to about 1% by weight; said water-soluble poly(hydroxyalkyl)polyethyleneamine is present in an amount from about 0.004% to about 0.5% by weight; said ethylene oxide adducts of ethylenediamine are present in an amount from about 0.0001% to about 0.08% by weight; and said morpholine derivatives are present in an amount from about 0.0004% to about 0.35% by weight, based on the total cementitious content.

8. The cementitious composition according to claim 6, wherein said salt of thiocyanic acid is selected from the group consisting of sodium, potassium, ammonium, calcium and magnesium thiocyanates; said water-soluble poly(hydroxyalkyl)polyethyleneamine is tetra(hydroxyethyl) ethylenediamine; said ethylene oxide adduct is selected from the group consisting of sym-dihydroxyethylethylenediamine, unsym-dihydroxyethylethylenediamine, aminoethylethanolamine, trihydroxyethylethylenediamine and tetrahydroxyethylethylenediamine; and said morpholine derivative is selected from the group consisting of morpholineaminodiglycol, morpholinyldiglycol, dimorpholinoethane, dimorpholinediglycol, methoxymethylmorpholine, morpholine ethaneamine and morpholine ethanol.

9. The cementitious composition according to claim 6, wherein said salt of thiocyanic acid is sodium thiocyanate.

10. The cementitious composition according to claim 6, wherein said water-soluble alkanolamine is tetra(hydroxyethyl)ethylenediamine.

11. The cementitious composition according to claim 1, wherein the water-soluble modified acrylic copolymer is present in an amount from 0.03% to about 0.4% by weight, based on the total cementitious content.

12. The cementitious composition according to claim 2, wherein the cement is Portland cement and is present in an amount from about 60% to about 100% by weight and the SCM is fly ash and is present in an amount from greater than 0% to about 40% by weight of the cement mixture.

13. The cementitious composition according to claim 1, wherein the superplasticizer and the at least one accelerant are present in amounts sufficient to provide an early compressive strength at 13 hours after application that is greater than or equal to 200% of the early compressive strength of a comparable composition not including the superplasticizer and the at least one accelerant.

14. A cementitious composition comprising:
   a cementitious mixture comprising:
      Portland cement in an amount from about 60% to about 100% by weight, based on the total cementitious content.
      fly ash in an amount from greater than 0% to about 40% by weight, based on the total cementitious content;
      a water-soluble modified acrylic copolymer superplasticizer in an amount from 0.03% to about 0.4% by weight, based on the total cementitious content;
      an accelerating composition comprising a salt of a thiocyanic acid in an amount from about 0.005% to about 1% by weight, a water-soluble poly(hydroxyalkyl)polyethyleneamine in an amount from about 0.004% to about 0.5% by weight, ethylene oxide adducts of ethylenediamine in an amount from about 0.0001% to about 0.08% by weight; and morpholine derivatives in an amount from about 0.0004% to about 0.35% by weight, based on the total cementitious content;
   aggregate in an amount from greater than 0% to about 80% by weight, based on the total cementitious content; and
   a sufficient amount of water to effect hydraulic setting of the cementitious composition.

15. A method for obtaining high early strength and increasing the flow of a cementitious composition, comprising the steps of:
   combining a hydraulic cement; an optional SCM; a superplasticizer comprising a water-soluble modified acrylic copolymer; at least one accelerant selected from the group consisting of salts of thiocyanic acid, water-soluble alkanolamines, ethylene oxide adducts of ethylenediamine, and morpholine derivatives; aggregate; and a sufficient amount of water to effect hydraulic setting of the cementitious composition.

16. An admixture for cementitious compositions comprising:

a superplasticizer comprising a water-soluble modified acrylic copolymer; and at least one accelerant selected from the group consisting of salts of thiocyanic acid, water-soluble alkanolamines, ethylene oxide adducts of ethylenediamine, and morpholine derivatives.

* * * * *